(12) United States Patent
Funayama

(10) Patent No.: US 12,132,831 B2
(45) Date of Patent: Oct. 29, 2024

(54) METHOD EMPLOYED IN USER AUTHENTICATION SYSTEM AND INFORMATION PROCESSING APPARATUS INCLUDED IN USER AUTHENTICATION SYSTEM

(71) Applicant: CANON KABUSHIKI KAISHA, Tokyo (JP)

(72) Inventor: Hirotaka Funayama, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 583 days.

(21) Appl. No.: 17/324,998

(22) Filed: May 19, 2021

(65) Prior Publication Data

US 2021/0273794 A1    Sep. 2, 2021

Related U.S. Application Data

(63) Continuation of application No. 15/980,587, filed on May 15, 2018, now Pat. No. 11,044,085.

(30) Foreign Application Priority Data

May 24, 2017   (JP) ................................ 2017-102857

(51) Int. Cl.
*H04L 9/08* (2006.01)
*G06F 21/32* (2013.01)
(Continued)

(52) U.S. Cl.
CPC .............. *H04L 9/0866* (2013.01); *H04L 9/14* (2013.01); *H04L 9/30* (2013.01); *H04L 9/3231* (2013.01); *H04L 9/3247* (2013.01); *H04L 9/3271* (2013.01)

(58) Field of Classification Search
CPC . H04L 9/0866; H04L 9/14; H04L 9/30; H04L 9/3231; H04L 9/3247;
(Continued)

(56) References Cited

U.S. PATENT DOCUMENTS

| 2004/0005051 | A1* | 1/2004 | Wheeler | ............... H04L 9/3231 380/28 |
| 2007/0079126 | A1* | 4/2007 | Hsu | ....................... G06F 21/606 713/181 |

(Continued)

FOREIGN PATENT DOCUMENTS

| CN | 104868998 A | 8/2015 |
| CN | 105656890 A | 6/2016 |

(Continued)

OTHER PUBLICATIONS

Li Chen; "A Security Framework Based on Two Layers of Online Identity Authentication System Design and Implementation;" Dissertation; Thesis for Master Degree, Shandong University; Oct. 15, 2014; pp. 1-74.

(Continued)

*Primary Examiner* — Vu V Tran
(74) *Attorney, Agent, or Firm* — Canon U.S.A., Inc. IP Division

(57) ABSTRACT

The present disclosure provides a system in which a migration operation which is different from a normal registration operation performed on a system is started in one of a terminal before replacement and a terminal after the replacement so that a registration operation performed on the terminal after the replacement is easily completed only by causing a user to consecutively perform an authentication operation on both of the terminals.

9 Claims, 14 Drawing Sheets

(51) Int. Cl.
*G06F 21/33* (2013.01)
*G06F 21/41* (2013.01)
*G06F 21/62* (2013.01)
*H04L 9/14* (2006.01)
*H04L 9/30* (2006.01)
*H04L 9/32* (2006.01)

(58) Field of Classification Search
CPC ... H04L 9/3271; H04L 9/0825; H04L 9/0844; G06F 21/32; G06F 21/33; G06F 21/41; G06F 21/62
See application file for complete search history.

(56) References Cited

U.S. PATENT DOCUMENTS

| | | | |
|---|---|---|---|
| 2010/0023755 A1* | 1/2010 | Kotani | H04L 9/006 713/155 |
| 2014/0208111 A1* | 7/2014 | Brandwine | H04L 9/0844 713/171 |
| 2016/0105285 A1 | 4/2016 | Jakobsson | |
| 2017/0272419 A1* | 9/2017 | Kumar | H04L 63/06 |
| 2018/0146046 A1* | 5/2018 | Deane | H04L 41/22 |
| 2018/0341759 A1* | 11/2018 | Sato | G06F 21/608 |
| 2021/0111900 A1* | 4/2021 | Inokuchi | H04L 9/3239 |

FOREIGN PATENT DOCUMENTS

| | | |
|---|---|---|
| CN | 106102058 A | 11/2016 |
| JP | 2008257365 A | 10/2008 |
| JP | 2017054420 A | 3/2017 |
| KR | 101690989 B1 | 1/2017 |

OTHER PUBLICATIONS

Zhang Xian-quan et al.; "Offline Signature Verification Based on Competitive Cluster;" Dept of Computer Science, Guangxi Nomal University, Guilin, Guangxi, 541004, China; (C) 1994-2021 China Academic Journal Electronic Publishing House; Jan. 1, 2007; pp. 191-193.

Ye Jianqing; "An Open Authorization Scheme based on FIDO UAF Architecture;" Feb. 10, 2017; pp. 1-6.

* cited by examiner

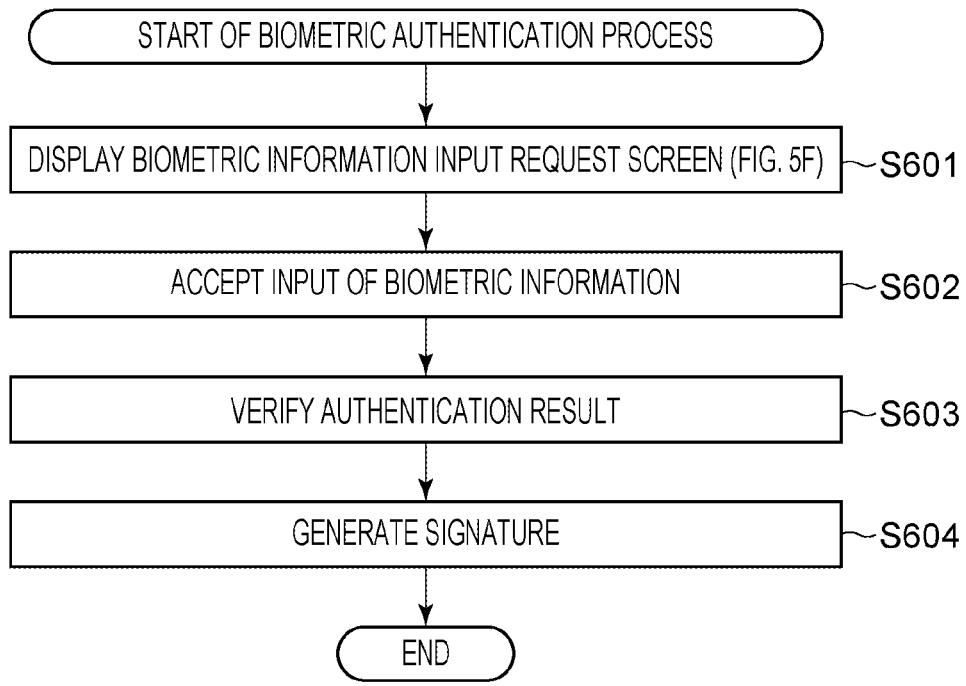
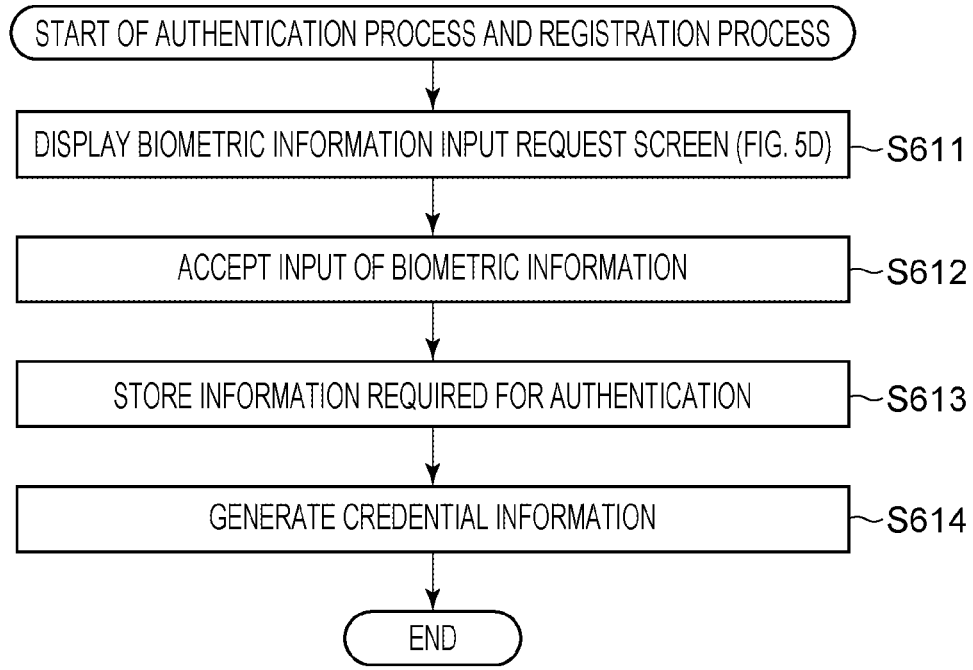

FIG. 8A

| SERVICE ID | MIGRATION URL |
|---|---|
| service-a.com | http://www.service-a.com/migration/fido/ |
| twittering.com | http://www.twittering.com/fido/auth/mig/ |
| cooking-site.com | null |
| : | : |

FIG. 8B

| ATTESTATION CHALLENGE | USER ID |
|---|---|
| 65C9B063-9C33 | user001 |
| 7317EFBA-4E63 | user101 |
| : | |

METHOD EMPLOYED IN USER AUTHENTICATION SYSTEM AND INFORMATION PROCESSING APPARATUS INCLUDED IN USER AUTHENTICATION SYSTEM

CROSS-REFERENCE TO RELATED APPLICATION

This application is a Continuation of U.S. application Ser. No. 15/980,587, filed May 15, 2028, which claims priority from Japanese Patent Application No. 2017-102857 filed May 24, 2017, which are hereby incorporated by reference herein in their entireties.

BACKGROUND

Field of the Disclosure

The present disclosure relates to a technique employed when data unique to an information processing apparatus, such as a mobile terminal including a desktop personal computer (PC), a tablet, or a smartphone, is migrated to another apparatus.

Description of the Related Art

In recent years, Fast Identity Online (FIDO) attracts attention as a new authentication system including biometric authentication. Biometric information, such as information on a fingerprint or a vein, to be used for biometric authentication is not replaceable if the information is leaked to an outside unlike a password in ID/password authentication, and therefore, information leakage is fatal. On the other hand, in one method assumed in FIDO, an authentication operation for using a service on a network, such as the Internet, is not performed in a server through the network but is performed in a terminal used by the user. Confirmation of the user in the service is ensured by another method after the authentication is successfully performed. Therefore, biometric information is not leaked on the network, that is, risk of information leakage is low.

In a method for performing authentication using biometric information including the method of FIDO described above, information required for the authentication is stored in a secured region having tamper resistance in the terminal. Therefore, the information required for the authentication may not be easily obtained since the information is securely managed, and therefore, data migration is comparatively difficult when an information processing apparatus used by the user is changed. In many cases, the user is requested to completely reregister the data using an information processing apparatus to be newly used.

The related art associated with the data migration is disclosed in Japanese Patent Laid-Open No. 2014-235583. In Japanese Patent Laid-Open No. 2014-235583, the following technique is disclosed. That is, in a case where data migration is performed between terminals, if migration data output from a migration source terminal is terminal dependent information, the migration data is converted into terminal independent information. When a migration destination terminal obtains the migration data output from the migration source terminal, the migration data is restored to terminal dependent information which is usable in the migration destination terminal.

When an information processing apparatus used by a user is changed (at a time of replacement purchase, for example), the user may desire to use a service employing the method including the authentication described above even after the change. However, when the service is to be continuously used, unique information managed in a secured region as described above is required in the apparatus after the change. Unlike the related art, the service may not be continuously used by simple data migration between old and new apparatuses.

SUMMARY

According to an aspect of the present disclosure, a method employed in a user authentication system includes a first information processing apparatus including a first authentication module and a first storage region having tamper resistance, the first storage region storing authentication information of a user required when an authentication process is performed by the first module and a first secret key generated when the authentication information is registered, and a second information processing apparatus including a communication function for communication with the first information processing apparatus, a second authentication module, and a second storage region having tamper resistance. The method employed in the user authentication system includes transmitting an authentication request including first verification data to the first information processing apparatus when the second information processing apparatus receives, through a network, the first verification data issued by a system in which a first public key paired with the first secret key stored in the first storage region is registered, generating signature data using the first secret key stored in the first storage region and the first verification data when a process of authenticating the user by the first authentication module is successfully performed in the first information processing apparatus, returning the signature data to the second information processing apparatus as a response to the authentication request from the first information processing apparatus, transmitting the signature data to the system through the network from the first information processing apparatus, receiving, in the first information processing apparatus, second verification data from the system through the network when the signature data is verified using the first public key in the system, and transmitting signature data generated using a second secret key and second verification data and a second public key to the system through the network so that the second public key is registered in the system when the second secret key and the second public key are generated when the authentication information of the user is registered using the second authentication module and when the authentication information and the second secret key are stored in the second storage region.

Further features of the present invention will become apparent from the following description of exemplary embodiments with reference to the attached drawings.

BRIEF DESCRIPTION OF THE DRAWINGS

FIGS. 6A and 6B are a flowchart of a process performed by a migration source terminal and a flowchart of a process performed by a migration destination terminal, respectively, according to the first embodiment.

FIGS. 8A and 8B are diagrams illustrating examples of data tables used in the first embodiment.

DESCRIPTION OF THE EMBODIMENTS

Hereinafter, embodiments of the present disclosure will be described with reference to the accompanying drawings.

First Embodiment

Figure 1:
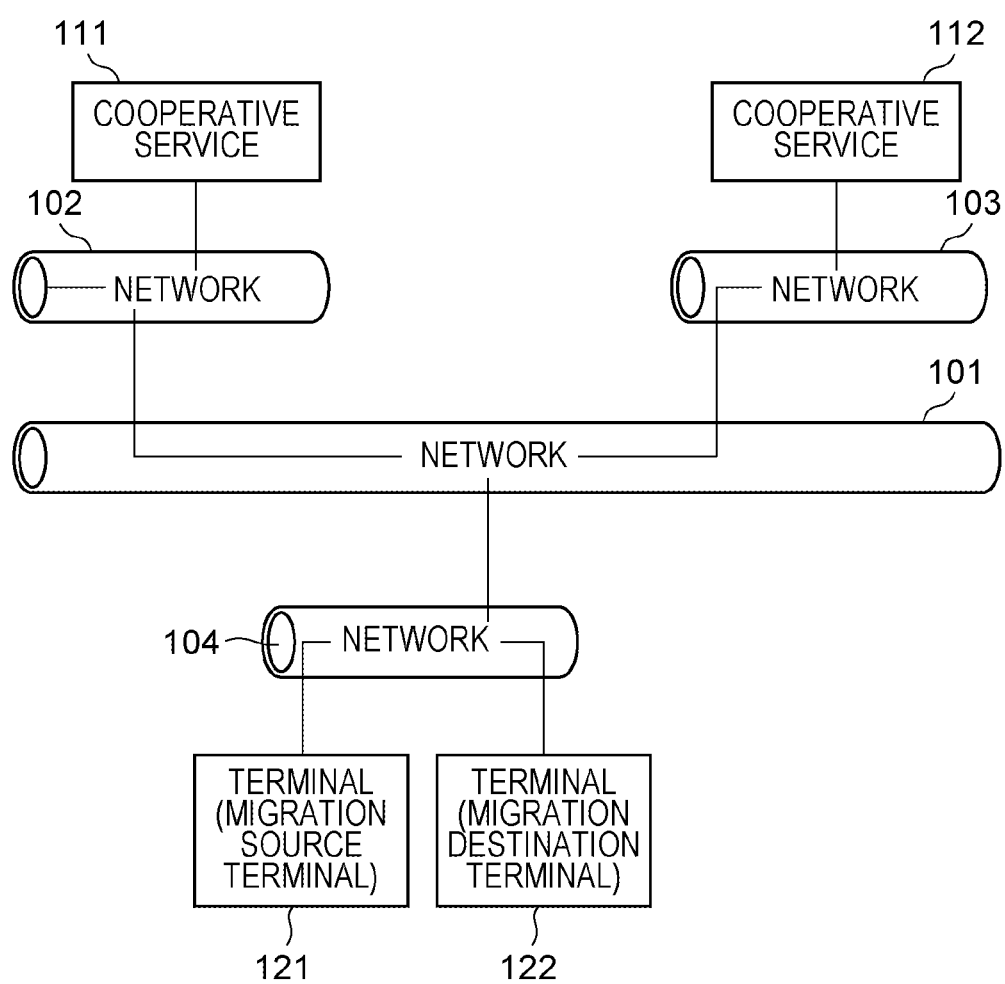
FIG. 1 is a diagram illustrating an example of a system configuration according to the present disclosure.

FIG. 1 is a diagram illustrating an example of an entire configuration of a system according to the present disclosure.

In FIG. 1, terminals 121 and 122, such as smartphones, and cooperative services 111 and 112 are connected to one another through networks 101 to 104 by a wired communication or a wireless communication. The networks 101 to 104 are communication networks constituted by a local area network (LAN) or a wide area network (WAN), such as the Internet, a telephone line, a dedicated digital line, an automated teller machine (ATM), a frame relay line, a cable television line, a data broadcasting wireless line, or the like. The networks 101 to 104 may be realized by a combination of such lines. Any network may be used as the networks 101 to 104 as long as the network may perform data transmission and data reception. In this specification, the network 101 is the Internet, and the networks 102 to 104 are an intranet or a network of a service provider.

The terminals 121 and 122 are information processing apparatuses, such as cellular phones, smartphones, or tablet terminals, incorporating a program execution environment. The terminals 121 and 122 are capable of executing applications, such as a web browser. Furthermore, each of the terminals 121 and 122 includes a sensor or a camera which obtains biometric information for authentication of a person and operates a program for verifying and authenticating the biometric information.

In this embodiment, the terminals 121 and 122 are referred to as a migration source terminal 121 and a migration destination terminal 122, respectively, for discrimination. For example, when a terminal is purchased for replacement or additionally purchased, an old terminal corresponds to the migration source terminal 121 and a new terminal to which an environment of the old terminal is to be migrated corresponds to the migration destination terminal 122. It is assumed in the present disclosure that the terminals 121 and 122 are connected to each other through a Bluetooth (registered trademark) communication. However, other wired or wireless communications, such as a communication using a universal serial bus (USB) or Wireless Fidelity (Wi-Fi), may be used for the connection.

Each of the cooperative services 111 and 112 is a service providing system which provides a function. The service providing system is executed in at least one server computer (including a virtual machine) and provides application programming interfaces (APIs) for applications operating in the terminals 121 and 122. The applications installed in the terminals 121 and 122 provide various functions utilizing the cooperative services 111 and 112 for users of the terminals 121 and 122 by calling the various APIs provided by the cooperative services 111 and 112. The users of the terminals 121 and 122 have accounts in the cooperative services 111 and 112 and may access data of the corresponding users included in the cooperative services 111 and 112 by being authenticated by the user's accounts in the cooperative services 111 and 112. In a system employing FIDO, the cooperative services 111 and 112 correspond to a relying party (RP) server and a FIDO server.

Figure 2:
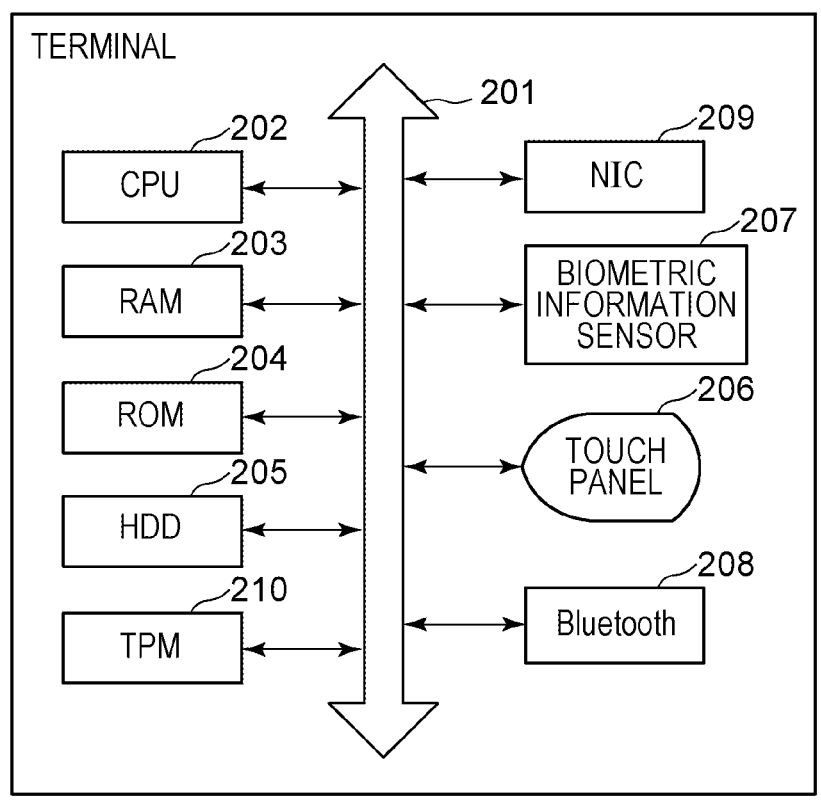
FIG. 2 is a diagram illustrating an example of a hardware configuration of an information processing apparatus according to the present disclosure.

FIG. 2 is a diagram illustrating an example of a hardware configuration of an information processing apparatus, such as the terminal 121 or 122 according to the present disclosure.

In FIG. 2, a central processing unit (CPU) 202 controls the entire apparatus. The CPU 202 executes an application program, an operating system (OS), and the like stored in a hard disc drive (HDD) 205 and temporarily stores information and files required for execution of programs in a random access memory (RAM) 203. A read only memory (ROM) 204 which is a storage unit, such as a flash memory, stores various data including a basic input/output (I/O) program. The RAM 203 which is a temporary storage unit functions as a main memory, a work area, and the like of the CPU 202. The HDD 205 which is one of auxiliary storage devices functions as a mass memory which stores application programs including a web browser, programs of a service server group, the OS, programs associated with processes unique to the present disclosure described below, and the like. The auxiliary storage devices may be realized by a solid state drive (SSD) or a secure digital (SD) card. A trusted platform module (TPM) 210 is a storage unit (a chip) of tamper resistance which prevents stored data from being externally read so as to process and store confidential information. Concrete examples of the storage unit of tamper resistance are based on a specification of TPM 2.0 (or a version which is later than TPM 2.0) which is an industry-wide standard. In the present disclosure, an authenticator 305 is used to store a feature value of biometric information to be used for authentication and a secret key described below.

A touch panel 206 has two functions, that is, a display function and an input function. The touch panel 206 displays a screen of an application, a keyboard, and the like and outputs information on a position in a screen touched by a user pressing a finger or a dedicated pen to an outside as an information signal. When the application uses information on the output signal so that the user may operate the application through the touch panel 206.

A biometric information sensor 207 reads biometric information of the user. Information on a fingerprint, an iris, a vein, a face image, a vocal print, and the like which is the biometric information is converted into a reading signal. A plurality of types of biometric information may be combined using a plurality of sensors so that feature values of combined data may be used as authentication information. Although it is assumed in the present disclosure that a fingerprint reading sensor is used as the biometric information sensor 207, another biometric information sensor, such as a camera, may be used. Furthermore, the biometric information sensor 207 may be realized by being overlapped with the touch panel 206, and fingerprint information may be read when the touch panel 206 is touched or when an input is performed so that the read fingerprint information is changed to an electric signal.

Bluetooth 208 is a transmitter/receiver which performs a Bluetooth communication and is a communication function capable of communicating with another Bluetooth supporting terminal when Bluetooth 208 is connected to the other Bluetooth supporting terminal. A system bus 201 controls a data flow in the apparatus. A network interface card (NIC) 209 performs data transmission and reception with an external apparatus through the NIC 209 and the networks 101 to 104. Note that the configuration of the computer is merely an example and is not limited to the configuration example of FIG. 2. Note that a destination of storage of data and programs may be switched among the ROM 204, the RAM 203, and the HDD 205 in accordance with characteristics of the data and the programs. The apparatus may include a USB interface. The biometric information sensor 207 and Bluetooth 208 may be realized by external hardware connected through a USB. Furthermore, in a case of cellular phones, a configuration not illustrated, such as hardware for a telephone call function, may be additionally provided.

Figure 3:
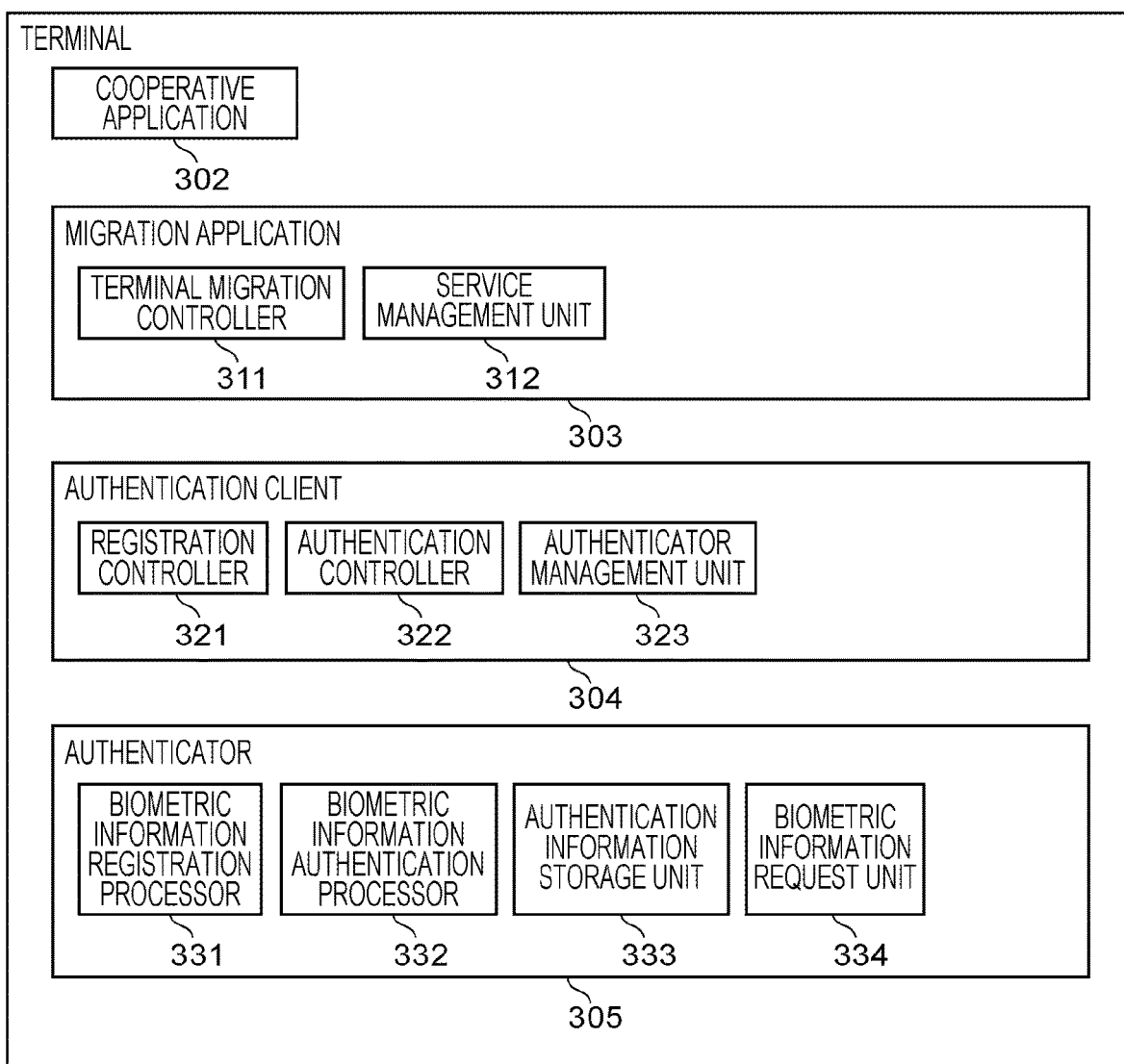
FIG. 3 is a diagram illustrating an example of a software configuration of the information processing apparatus according to the present disclosure.

In addition, a software configuration illustrated in FIG. 3 and processes in steps in flowcharts of FIGS. 6A and 6B are realized when the CPU 202 executes processes based on associated programs stored in the HDD 205.

FIG. 3 is a diagram illustrating an example of a module configuration of software of the information processing apparatuses including the terminals 121 and 122.

The terminal 121 includes functions of a cooperative application 302, a migration application 303, an authentication client 304, and an authenticator 305.

Note that, in the present disclosure, the authenticator 305 is an authentication module which particularly manages authentication information which is biometric information in cooperation with the biometric information sensor 207 serving as an authentication device and which controls the biometric information sensor 207. In each of the terminals, a plurality of authenticators may be connected and each of the authenticators may manage information on a plurality of biometric information sensors. Furthermore, another authentication terminal having a biometric information sensor externally connected to the terminals in a wireless manner or the like may be used as an external authenticator.

The cooperative application 302 provides functions for the user by communicating with the various APIs provided by the cooperative services 111 and 112. When the user accesses the cooperative services 111 and 112 using the cooperative application 302, authentication is required to be performed relative to the cooperative services 111 and 112 using authentication information stored in an authentication information storage unit 333 of the authenticator 305. Note that, in a case where cooperative applications are provided for respective cooperative services, the plurality of cooperative applications are installed in the terminals.

The migration application 303 is used when information which is managed in the migration source terminal 121 and which is required for authentication relative to the cooperative services 111 and 112 is migrated to the migration destination terminal 122. The migration application 303 is executed by the migration destination terminal 122 and includes a terminal migration controller 311 which controls a process for data migration between the terminals 121 and 122 and a service management unit 312 which uses information on cooperative services which are targets of the migration as a list. If the migration application 303 of the migration destination terminal 122 performs communication through the OS of the migration source terminal 121, the migration application 303 is not required in the migration source terminal 121.

The authentication client 304 including a registration controller 321, an authentication controller 322, and an authenticator management unit 323 manages information required for authentication for cooperation with the cooperative services 111 and 112 and at least one authenticator. In a system employing FIDO, the authentication client 304 corresponds to a FIDO client.

The authenticator 305 controls an authentication process in the terminal mainly using biometric information and manages information required for authentication on a cooperative service. The authenticator 305 includes a biometric information registration processor 331, a biometric information authentication processor 332, the authentication information storage unit 333, and a biometric information request unit 334. Here, the authentication information storage unit 333 stores information on a secret key which is paired with a public key to be registered in the cooperative service, for example, as information required for authentication in the TPM 210.

Note that at least one of the migration application 303, the authentication client 304, and the authenticator 305 may be realized as a function of software bundled in the OS operating in the terminal 121 or a function of the OS.

Next, a process of registering biometric information, for example, required for use of the cooperative service in the migration source terminal 121 which is an assumption of the present disclosure will be described.

The cooperative application 302 of the migration source terminal 121 starts the biometric information registration process when accessing the cooperative service. Note that, if the cooperative application 302 is a web browser and the cooperative service is a web application to be accessed by the web browser, the registration process may be realized by java script. When the process is started, the cooperative service requests the cooperative application 302 to input a user ID and a password and waits for a user's input. When the ID and the password are appropriately input, a biometric information input process is performed by the authentication client 304 and the authenticator 305 through the cooperative application 302 of the migration source terminal 121 using the cooperative service as a start point.

The biometric information request unit 334 accepts an input of biometric information, such as fingerprint information, from the user through the biometric information sensor 207. After the biometric information is input, feature amount information corresponding to the input biometric information on a one-to-one basis to which a unique ID is assigned is stored in the TPM 210. Subsequently, the biometric information registration processor 331 generates a public key and a secret key. Thereafter, the authentication information storage unit 333 associates a service ID for identifying the cooperative service, the user ID, the password, the generated secret key, and an ID corresponding to the feature value information corresponding to the input biometric information on a one-to-one basis with one another to be stored in the TPM 210. Here, an example of a portion of the information stored in the authentication information storage unit 333 will be illustrated in Table A.

TABLE A

| Authentication Information ID | Service ID | Secret Key | Biometric Information ID |
|---|---|---|---|
| 407c-8841-79d | service-a.com | 1faea2da-a269-4fa7-812a-509470d9a0cb | d493a744 |
| 4c04-428b-a7a2 | service-a.com | d7ae30c8-3775-4706-8597-aaf681bc30f5 | dcc97daa |
| 92b2-498d-bea6 | twitter.com | 36ae5eed-732b-4b05-aa7b-4dddb4be3267 | 51caacaa |
| . | . | . | |
| . | . | . | |
| . | . | . | |

In Table A, a column of an authentication information ID includes IDs unique to individual authentication information. A column of a service ID stores information on a top-level domain or a second-level domain of a cooperative service. A column of a secret key stores secret keys generated as described above. A column of a biometric information ID stores IDs corresponding to feature values of biometric information stored in the authentication information storage unit 333 of the migration source terminal 121.

The biometric information registration processor 331 supplies a public key generated so as to be paired with the secret key stored in the TPM 210 and an authentication information ID corresponding to the secret key to the authentication client 304. The registration controller 321 transmits the authentication information ID and the public key to the cooperative service.

In the cooperative service, the transmitted authentication information ID and the transmitted public key are stored and managed while being associated with a user ID and a password. Table B is an example of a portion of a data table managed by the cooperative service.

TABLE B

| Authentication Information ID | Public Key | User ID |
|---|---|---|
| 407c-8841-79d | AC43C5FB-BFA2-48D1-A71B-FB04ACDA347A | user001 |
| 4c04-428b-a7a2 | 8143CA9F-35C9-4333-948F-BFCE66A74310 | user002 |
| . | . | |
| . | . | |
| . | . | |

Authentication information IDs and public keys transmitted from the authentication client 304 and associated with user IDs are stored in a column of an authentication information ID and a column of a public key, respectively.

Thereafter, when the cooperative service is to be used, authentication is performed by the biometric information authentication processor 332 in the terminal based on the biometric information, and data supplied from the cooperative service using a secret key corresponding to a biometric information ID specified by the authentication is encrypted. Then the cooperative application 302 transmits the encrypted data (a signature 723 described below) to the cooperative service. In the cooperative service, the received data is decrypted by a registered public key. When validity of the data is confirmed, it is determined that personal authentication has been successfully performed, and the service is provided.

Note that a procedure of storage of information equivalent to that in Table A described above and a procedure of registration of a public key in a cooperative service to be performed by the migration destination terminal 122 will be described hereinafter with reference to FIGS. 6A and 6B.

Figure 4:
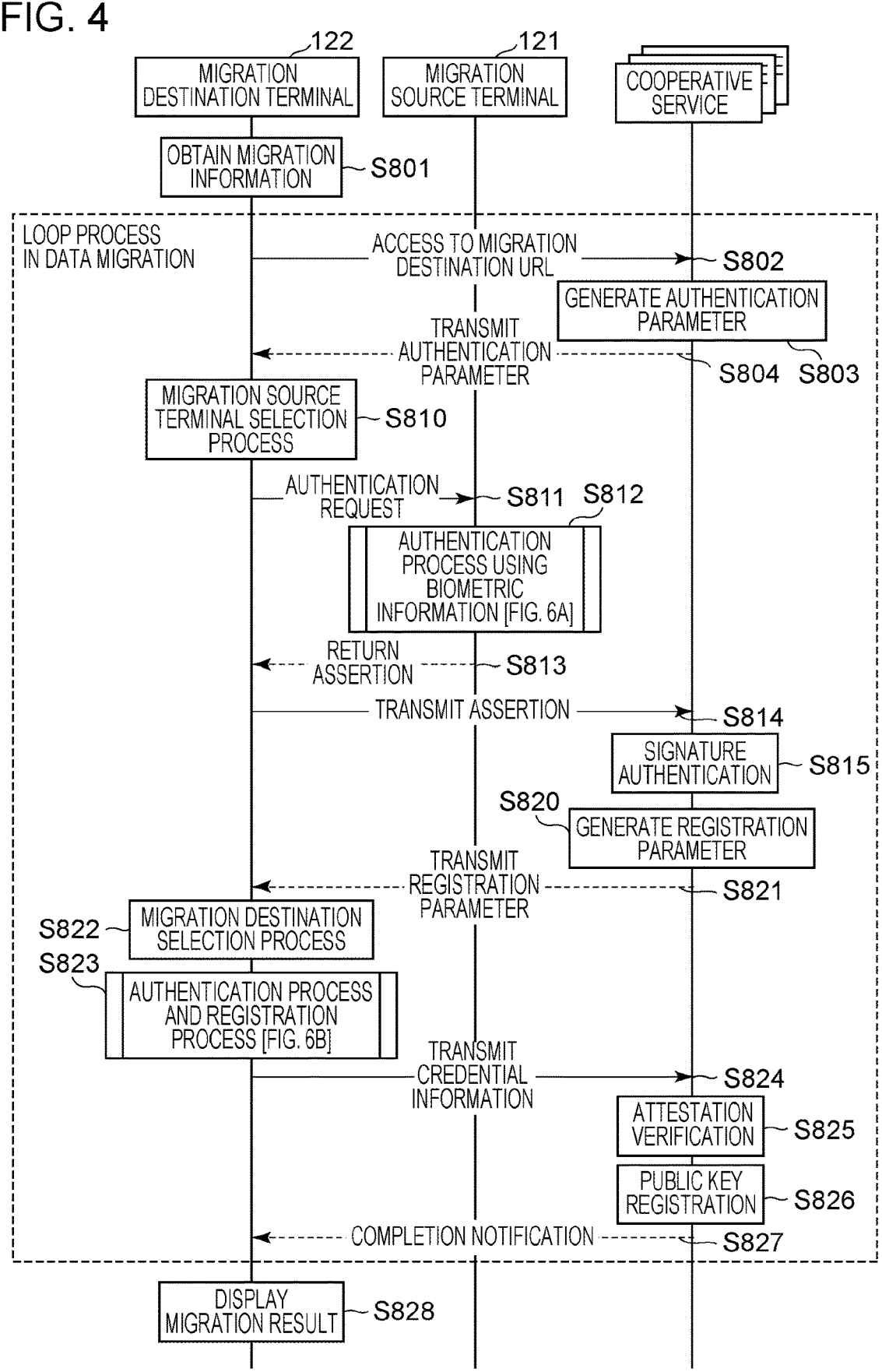
FIG. 4 is a sequence illustrating an entire migration operation according to a first embodiment.

FIG. 4 is a sequence diagram illustrating a flow of an entire process performed when information required for authentication is migrated from the migration source terminal 121 after the user starts an operation using the migration destination terminal 122. In the data migration process, an authentication process (S802 to S815) and a registration process (S820 to S827) are successively performed by the migration source terminal 121 and the migration destination terminal 122, respectively, for each cooperative service of a migration target.

First, the user starts data migration from the migration source terminal 121 in accordance with a data migration wizard or the like of the migration destination terminal 122. In this case, the migration source terminal 121 and the migration destination terminal 122 are connected to each other by the user through Bluetooth 208 or the like. In the process performed in accordance with the data migration wizard, the cooperative application 302 which has been installed in the migration source terminal 121 is activated. Note that the authentication client 304 of the migration destination terminal 122 may recognize the authenticator 305 of the connected migration source terminal 121 as an external authenticator. Accordingly, the authenticator in the connected migration source terminal 121 is managed by the authenticator management unit 323 of the migration destination terminal 122. Therefore, in the sequence illustrated in FIG. 4, communication between the migration source terminal 121 and the migration destination terminal 122 is performed using the authenticator 305 of the migration source terminal 121 and the authentication client 304 of the migration destination terminal 122 through OSs of the terminals or the like.

Note that, in the present disclosure, the authenticator 305 of the migration destination terminal 122 is included in the same terminal when viewed from the authentication client 304 of the migration destination terminal 122, and therefore, the authenticator 305 of the migration destination terminal 122 is referred to as an internal authenticator and the authenticator 305 of the migration source terminal 121 is referred to as an external authenticator.

Hereinafter, as for descriptions of hardware and software modules, the terminal migration controller 311 of the migration destination terminal 122 is simply referred to as the "terminal migration controller 311", for example, unless otherwise noted. Similarly, the TPM 210 of the migration destination terminal 122 is simply referred to as the "TPM 210".

On the other hand, the terminal migration controller 311 of the migration source terminal 121 is referred to as the "terminal migration controller 311 of the migration source terminal 121" so that the migration source terminal 121 is emphasized.

Subsequently, the cooperative application 302 of the migration destination terminal 122 obtains application data from the migration source terminal 121 and stores the application data in an auxiliary storage unit. In this case, the cooperative application 302 of the migration destination terminal 122 obtains migration information of the cooperative service illustrated in FIG. 8A (a service list) stored in the migration source terminal 121 and stores the migration information in the auxiliary storage unit included in the migration destination terminal 122 in step S801.

A column of a service ID stores information on a top-level domain or a second-level domain of cooperative services. When a URL of a cooperative service is represented by "http://www.service-a.com", "service-a.com" is stored in the column of a service ID. A column of a migration URL stores URLs of APIs provided by the cooperative services corresponding to the service IDs so that information required for the authentication is migrated. A number of services may not have migration URLs, and therefore, in such a case, "null" is described in the column of a migration URL. The migration URLs are obtained by the migration source terminal 121 from the cooperative services in advance.

Note that the migration information included in the service list may be managed by the OSs of the terminals, the authenticator 305, or other modules. In any case, the cooperative application 302 of the migration destination terminal 122 obtains the migration information through the OS of the migration source terminal 121.

Subsequently, the cooperative application 302 of the migration destination terminal 122 repeatedly performs a loop process (S802 to S827) in the data migration on operative services having migration URLs other than "null" which are registered in the service list. A process of simply registering information required for authentication is executed in a cooperative service of the migration source terminal 121 by the access to the migration URL provided by the cooperative service in advance in this embodiment. Note that even if the migration URL is not described, this process may be realized when a link for the migration service is provided in a web site of the cooperative service or the like and the user specifies the link.

In step S802, the terminal migration controller 311 accesses a migration destination URL in the service list so as to perform authentication for the cooperative service.

Figure 7A:
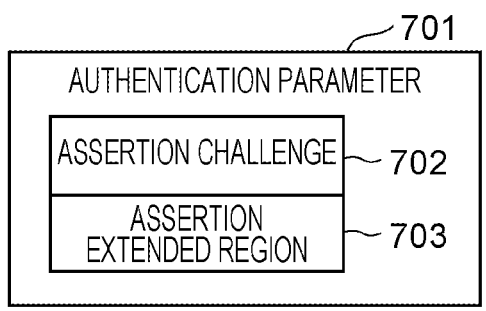
FIGS. 7A to 7F are diagrams illustrating examples of configurations of data used in the migration operation.

In step S803, the cooperative service generates an authentication parameter 701 illustrated in FIG. 7A. The authentication parameter 701 includes an assertion challenge 702 and an assertion extended region 703. The assertion challenge 702 is verification data to be used for challenge response authentication. The assertion extended region 703 stores an extended parameter which may be specified by the cooperative service so that the cooperative service controls operations of the authentication client 304 and the authenticator 305. Subsequently, in step S804, the cooperative service transmits the authentication parameter 701 generated in step S803 to the terminal migration controller 311.

Figure 5A:
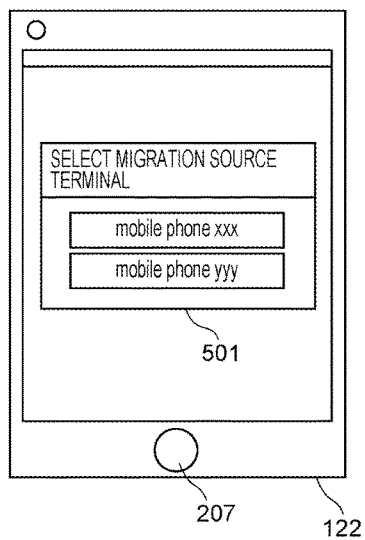
FIGS. 5A to 5F are diagrams illustrating examples of screens displayed in individual terminals in the migration operation.

In step S810, the terminal migration controller 311 supplies the authentication parameter 701 to the authentication controller 322. The authentication controller 322 displays a selection screen 501 for selecting one of migration source terminals illustrated in FIG. 5A in the touch panel 206 of the migration destination terminal 122. The user selects the migration source terminal 121 through the touch panel 206 of the migration destination terminal 122. Here, information on terminals which have been connected is displayed in the selection screen 501 of the migration source terminal 121. Alternatively, authenticators managed by the authenticator management unit 323 including authenticators of terminals which have been connected are displayed in the selection screen 501 of the migration source terminal 121 as selection candidates.

Figure 5B:
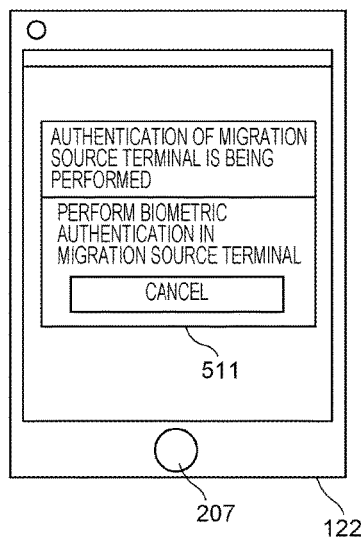

When the migration source terminal 121 is selected through the selection screen 501, the authentication controller 322 displays a screen 511 which prompts biometric authentication in the migration source terminal 121 illustrated in FIG. 5B in the touch panel 206. When a cancel button is pressed, the data migration process is aborted.

Figure 7B:
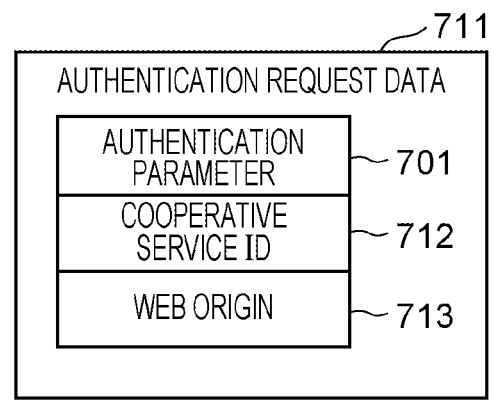

In step S811, the authentication controller 322 transmits an authentication request to the biometric information authentication processor 332 of the migration source terminal 121 selected in step S810 using authentication request data 711 illustrated in FIG. 7B. Here, the authentication request data 711 includes the authentication parameter 701, a cooperative service ID 712, and Web Origin 713. Web Origin 713 and the cooperative service ID 712 are the migration URL and the service ID, respectively, in the service list.

In step S812, the biometric information authentication processor 332 of the migration source terminal 121 executes an authentication process using biometric information. FIG. 6A is a flowchart illustrating the authentication process using biometric information performed by the migration source terminal 121 in detail.

Figure 5C:
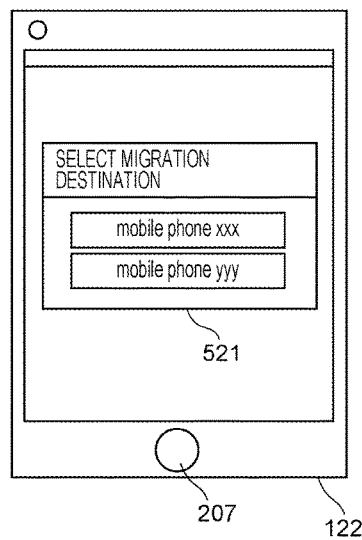
Figure 5D:
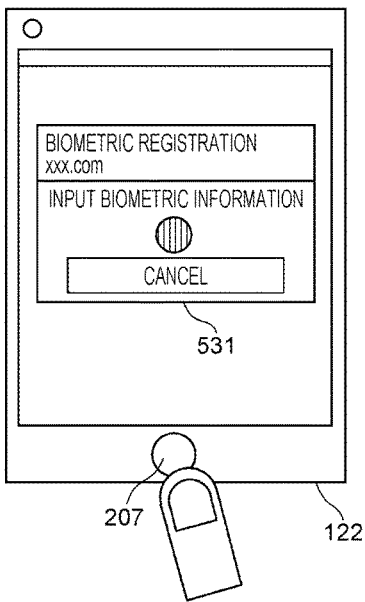
Figure 5E:
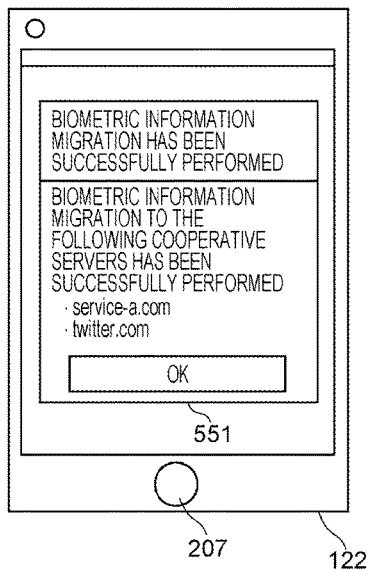
Figure 5F:
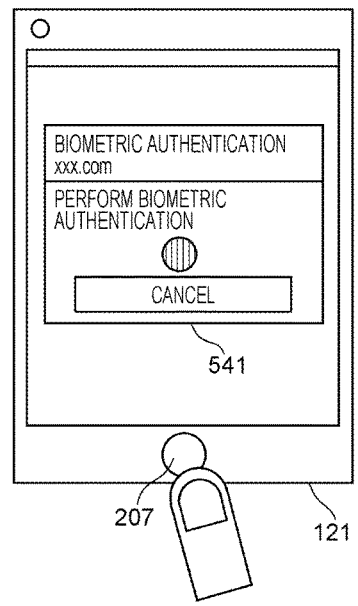

In step S601, the biometric information authentication processor 332 of the migration source terminal 121 displays a screen 541 for requesting an input of biometric information illustrated in FIG. 5F in the touch panel 206 of the migration source terminal 121 and prompts the user to input biometric information to the biometric information sensor 207. In step S602, the biometric information authentication processor 332 of the migration source terminal 121 obtains a feature value of the biometric information of the user read by the biometric information sensor 207 of the migration source terminal 121 through the biometric information request unit 334 of the migration source terminal 121. The feature value is obtained by converting an object unique to a person, such as a pattern of a fingerprint, a pattern of an iris, or a shape of a vein into a value without deteriorating the uniqueness.

In step S603, the biometric information authentication processor 332 of the migration source terminal 121 executes biometric information authentication by comparing the obtained feature value with a feature value of biometric information which has been stored in the TPM 210 of the migration source terminal 121. When a feature value having a predetermined matching degree is specified, it is determined that the authentication is successfully performed. The biometric information authentication processor 332 of the migration source terminal 121 specifies a secret key stored in the TPM 210 of the migration source terminal 121 using a biometric information ID corresponding to the feature value which has been successfully authenticated.

In step S604, the biometric information authentication processor 332 of the migration source terminal 121 encrypts the assertion challenge 702 included in the authentication parameter 701 using the specified secret key so as to generate the signature 723.

The description returns to the sequence illustrated in FIG. 4.

Figure 7C:
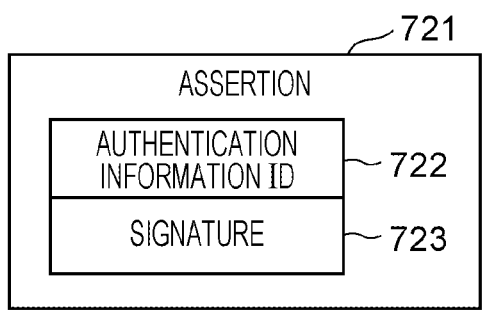

In step S813, the biometric information authentication processor 332 of the migration source terminal 121 generates an assertion 721 (FIG. 7C) including the signature 723 generated by the authentication process using the biometric information performed in step S812 and returns the assertion 721 to the terminal migration controller 311 through the authentication controller 322 of the migration destination terminal 122. The assertion 721 includes an authentication information ID 722 and the signature 723. The authentication information ID 722 is associated with a biometric information ID used for the signature generation in step S604 described above and managed in Table A.

In step S814, the terminal migration controller 311 transmits the assertion 721 to the cooperative service.

In step S815, the cooperative service verifies the signature 723 included in the assertion 721. Specifically, the cooperative service specifies a public key corresponding to the authentication information ID 722 in accordance with Table B above and decrypts the signature 723. The cooperative service compares the decrypted data with the assertion challenge 702 included in the authentication parameter 701 which has been transmitted in step S804 so as to determine whether the decrypted data matches the assertion challenge 702. When the determination is affirmative, a legitimate request by the authenticator of the registered user is verified. Accordingly, a user ID corresponding to the user who intends to execute this migration process is specified in Table B.

Note that the verification process is performed not only in the data migration process described in this sequence but also in authentication performed when the terminal uses the cooperative service. Specifically, the verification process is performed to authenticate the user who intends to execute the data migration process.

In the authentication process in step S812, when the authentication process using the biometric information has failed in step S603, a signature is not generated in step S604 and the biometric information authentication processor 332 of the migration source terminal 121 transmits an authentication error to the terminal migration controller 311 of the migration destination terminal 122. In this case, the process returns to FIG. 4 and the loop process is executed on a next cooperative service. If a cooperative service to be processed does not exist, the sequence in FIG. 4 is terminated.

Next, the registration process is performed on the cooperative service using the authenticator 305 of the migration destination terminal 122.

Figure 7D:
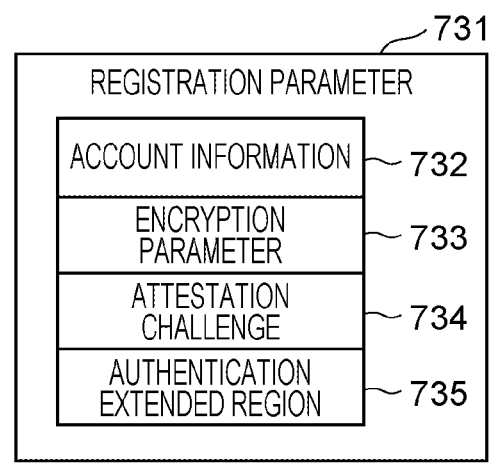

In step S820, the cooperative service generates a registration parameter 731 illustrated in FIG. 7D. In step S821, the cooperative service transmits the generated registration parameter 731 to the terminal migration controller 311 of the migration destination terminal 122.

The registration parameter 731 includes account information 732, an encryption parameter 733, an attestation challenge 734, and an authentication extended region 735. As the account information 732, the user ID specified in step S815 or attribute information, such as a user name, associated with the user ID is set. As the encryption parameter 733, attribute information associated with authentication information to be registered, such as an encryption algorithm supported by the cooperative service is set. The attestation challenge 734 is verification data (a parameter value) issued by the cooperative service so as to perform the challenge response authentication. The authentication extended region 735 stores an extended parameter which may be specified by the cooperative service so that the cooperative service controls operations of the authentication client 304 and the authenticator 305.

FIG. 8B is a diagram illustrating an example of a table for managing an issuance state of attestation challenges managed by the cooperative service. According to FIG. 8B, the relationship between a user ID and an issued attestation challenge may be specified.

A column of an attestation challenge stores data on issued attestation challenges. A column of a user ID stores information on IDs of users who have issued the attestation challenges. Here, the attestation challenge 734 associated with the user ID specified in step S815 is managed.

Figure 7E:
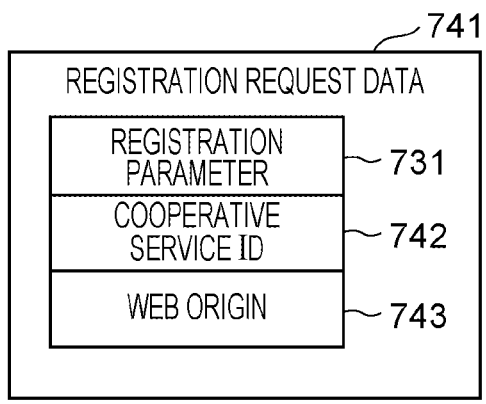

In step S822, the registration controller 321 of the migration destination terminal 122 displays a migration destination selection screen 521 illustrated in FIG. 5C in the touch panel 206 of the migration destination terminal 122 in accordance with a biometric information registration request using the registration parameter 731 supplied from the terminal migration controller 311. The user selects a migration destination through the migration destination selection screen 521. Here, the internal authenticator or the external authenticator is selected as the migration destination. Subsequently, the registration controller 321 supplies registration request data 741 illustrated in FIG. 7E to the biometric information registration processor 331 of the authenticator 305 of the migration destination terminal 122 selected as the migration destination. Here, the registration request data 741 includes the registration parameter 731, a cooperative service ID 742, and Web Origin 743. Web Origin 743 and the cooperative service ID 742 are a value in the column of a migration URL and a value in the column of a service ID, respectively, in the service list.

In step S823, the authenticator 305 executes the authentication process and the registration process using the biometric information in the migration destination terminal 122. FIG. 6B is a flowchart illustrating the process performed by the migration destination terminal 122 in step S823 in detail.

In step S611, the biometric information request unit 334 displays the screen for requesting an input of biometric information illustrated in FIG. 5D in the touch panel 206 in response to the registration request issued by the authentication client 304 to the authenticator 305 (reception of the registration request data 741 by the biometric information registration processor 331). This display prompts the user to input biometric information to the biometric information sensor 207. In step S612, the biometric information registration processor 331 receives a feature value of the biometric information input to the biometric information sensor 207.

In step S613, the authentication information storage unit 333 stores the feature value of the biometric information obtained in step S612 and a unique ID (a biometric information ID) assigned to information on the feature value in the TPM 210 of the migration destination terminal 122. Simultaneously, the biometric information registration processor 331 generates a secret key, a public key, and an authentication information ID corresponding to the biometric information ID. Then the authentication information storage unit 333 stores the generated authentication information ID, the cooperative service ID 742 included in the registration request data 741, the generated secret key, and the biometric information ID which are associated with one another in the TPM 210. The information is stored and managed here in a format the same as that of Table A of the migration source terminal 121 described above.

Figure 7F:
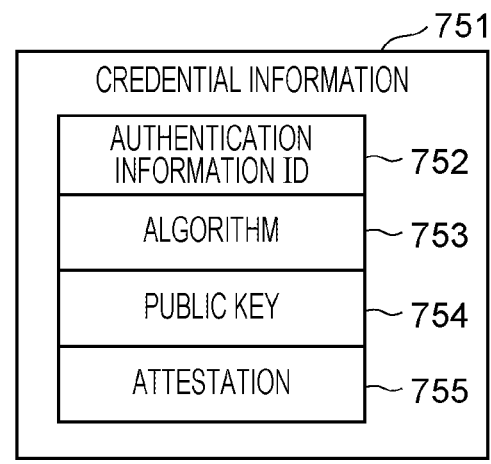

In step S614, the biometric information registration processor 331 generates credential information 751 illustrated in FIG. 7F. The credential information 751 includes an authentication information ID 752, an algorithm 753, a public key 754, and an attestation 755.

An authentication information ID corresponding to the public key generated in step S613 is set to the authentication information ID 752. An algorithm used when the key is generated in step S613 is set to the algorithm 753. The public key generated in step S613 is set to the public key 754. Furthermore, data encrypted using the secret key used to generate the attestation challenge 734 in step S613 is set to the attestation 755.

The sequence illustrated in FIG. 4 is described again.

In step S824, the terminal migration controller 311 obtains the credential information 751 generated by the biometric information registration processor 331 through the registration controller 321 and transmits the credential information 751 to the cooperative service. The credential information 751 is transmitted as a response to the registration parameter 731 transmitted from the cooperative service in step S821.

In step S825, the cooperative service executes a process of verifying the attestation 755 included in the credential information 751. Specifically, the cooperative service decrypts the attestation 755 included in the credential information 751 by the public key included in the credential information 751. Then the decrypted data is compared with the issued attestation challenges in the table of FIG. 8B described above. It is determined that a user ID associated with the attestation challenge which matches decrypted data in the table of FIG. 8B corresponds to an ID of a user who intends to perform the registration process using the credential information 751.

In step S826, the cooperative service additionally registers the authentication information ID 752 and the public key 754 which are included in the credential information 751 and which are associated with the specified user ID in Table B described above.

In step S827, the cooperative service notifies the terminal migration controller 311 of normal completion of the registration process.

The terminal migration controller 311 of the migration destination terminal 122 proceeds to step S828 when the loop process is performed on all cooperative services in which migration URLs registered in the service list (FIG. 8A) are not "null".

In step S828, the terminal migration controller 311 of the migration destination terminal 122 displays a notification screen 551 for displaying a result of the migration illustrated in FIG. 5E. In FIG. 5E, information indicating that the data migration has been successfully performed so that the two services registered in the service list of the migration source terminal 121 may be equally used by the migration destination terminal 122 is transmitted.

Advantages of this Embodiment

When the present disclosure is not employed, the migration destination terminal 122 accesses the cooperative services of migration targets, performs authentication (login) using a user ID and a password, performs biometric authentication again, and thereafter, registers an authentication information ID and a public key in a service again.

However, in the present disclosure, the authentication (login) using a user ID and a password performed by the migration destination terminal 122 on the cooperative services of the migration targets may be omitted.

Accordingly, when a model of a smartphone is changed, for example, information required for authentication for various services may be easily migrated in a customer service of a carrier of a cellular phone company. Furthermore, a migration operation may be performed while inputs of a user ID and a password are avoided in a location where a large number of third parties exist, such as a customer service or a carrier.

Modification

In this embodiment, a trigger of the migration operation is a user operation performed on the migration application 303 of the migration destination terminal 122. In this case, the migration source terminal 121 is used as an external authenticator in the authentication process (S812) relative to the cooperative services 111 and 112 whereas the internal authenticator in the migration destination terminal 122 is used in the registration process (S823).

However, the trigger of the migration operation may be a user operation performed on the migration application 303 of the migration source terminal 121. In this case, the internal authenticator included in the migration source terminal 121 is used in the authentication process (S812) performed for the cooperative services 111 and 112 whereas the internal authenticator included in the migration destination terminal 122 is used as the external authenticator in the registration process (S823).

Note that, as a method for registering information corresponding to Table B in the cooperative services 111 and 112, the authentication process performed relative to the cooperative services 111 and 112 in the process from step S802 to step S815 may be performed by a method which does not use the biometric authentication, such as Basic authentication.

Second Embodiment

In the first embodiment, the user repeatedly performs the biometric authentication using the migration source terminal 121 and the biometric authentication using the migration destination terminal 122 for each cooperative service so that the migration operation is performed. The biometric authentication is performed without particular complication by performing imaging by a camera or the like, such as face image authentication or iris recognition, in a state in which both of the terminals 121 and 122 are fixed so that an authentication target may be imaged at any time. However, when the biometric information sensor 207 which reads fingerprint information is employed, an operation of alternately holding a finger over the terminals 121 and 122 is to be performed in accordance with display of the terminals 121 and 122. In a case of a large number of cooperative services, the operation may be troublesome for the user. In a second embodiment, a process performed to address such an adverse effect will be described.

Figure 9:
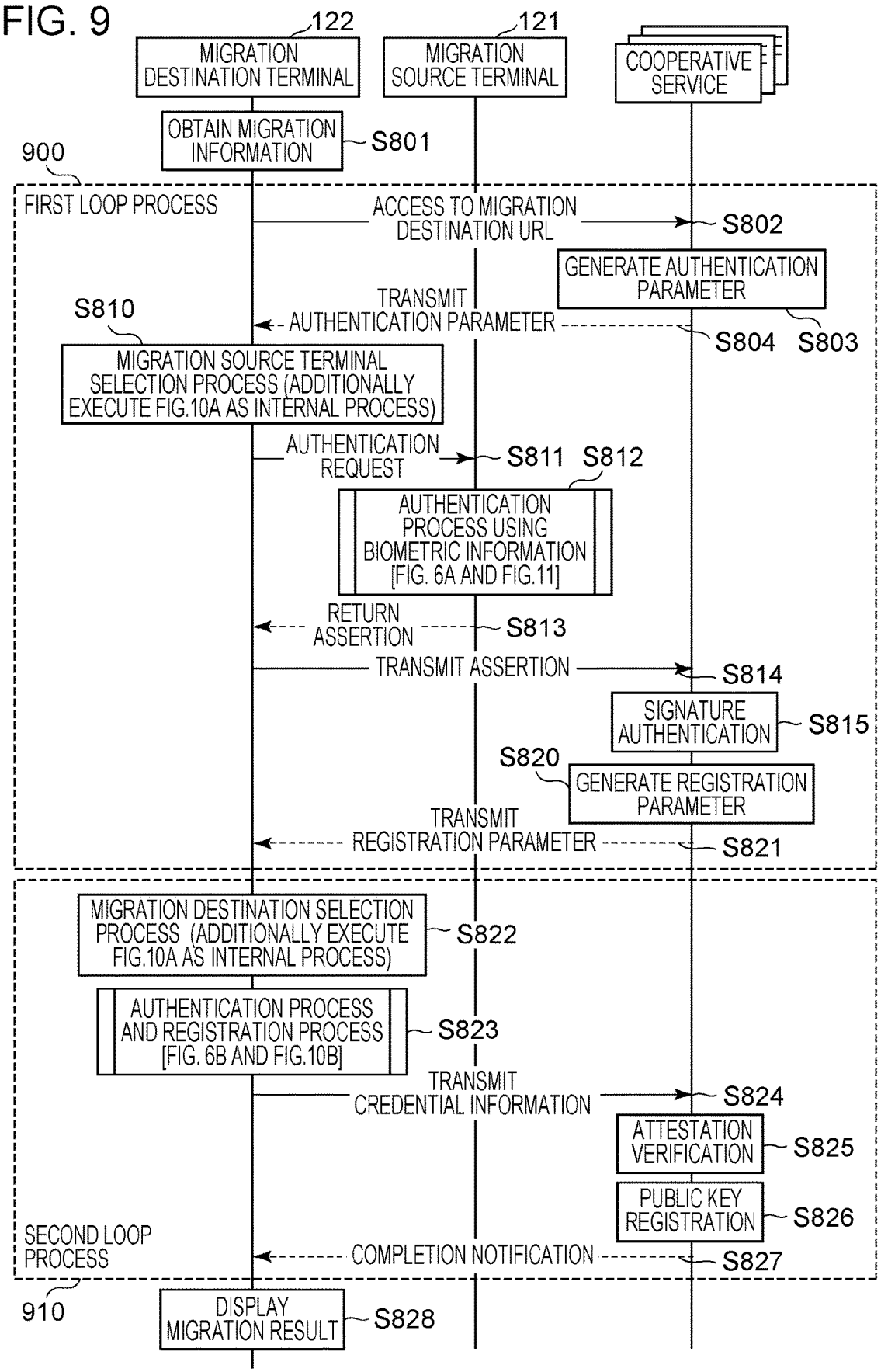
FIG. 9 is a sequence illustrating an entire migration operation according to a second embodiment.

The second embodiment is different from the first embodiment in that, in a case where a plurality of cooperative services exist as illustrated in FIG. 9, the process from step S802 to step S821 of FIG. 4 according to the first embodiment is first performed on all the cooperative services. Thereafter, the process from step S822 to step S827 is performed on all the cooperative services. Specifically, as illustrated in FIG. 9, the loop process for each cooperative service is divided into a first loop process (900) and a second loop process (910). In this way, even in a case where a large number of cooperative services which are migration targets exist, biometric authentication operations in the individual terminals may be collectively performed.

Specifically, in this embodiment, while the process from step S802 to step S821 is repeatedly performed, a migration source terminal 121 causes a user to maintain a state in which the user holds a finger over a biometric information sensor 207 serving as a fingerprint sensor so as to continuously receive an input of biometric information. Similarly, also in this embodiment, while the process from step S822 to step S827 is repeatedly performed, a migration destination terminal 122 also causes the user to maintain the state in which the user holds a finger over the biometric information sensor 207 so as to continuously receive an input of biometric information.

In the process of FIG. 9, portions different from the process of FIG. 4 according to the first embodiment will be described. A terminal migration controller 311 of a migration application 303 additionally describes extended information below in an assertion extended region 703 of an authentication parameter 701 received from a cooperative service.

{"sessionid": "ab12-127d-012b-2be5", "repeatnum": 2}

Here, "sessionid" included in the extended information indicates a unique ID in a unit of the sequence of FIG. 9. Furthermore, "repeatnum" included in the extended information indicates the total number of operative services registered in a service list which includes migration URLs. Here, the number of operative services in which valid migration URLs are registered is 2 as illustrated in FIG. 8A, and therefore, a value "2" is set to the extended information.

In the first loop process 900 which is performed a number of times corresponding to the number of operative services per one migration process, the terminal migration controller 311 additionally describes the same value "sessionid" as specified extended information in all authentication parameters received from the cooperative services.

The authentication parameter 701 to which the extended information is additionally described is supplied from the terminal migration controller 311 through an authentication controller 322 finally to a biometric information authentication processor 332 of the migration source terminal 121 as authentication request data in step S811.

Using the extended information, it is determined (as described below with reference to FIG. 10A) whether a screen 501 and a screen 511 are to be displayed in the migration destination terminal 122 in a period from step S810 to step S812 in the sequence illustrated in FIG. 9. Furthermore, the migration source terminal 121 determines whether a screen 541 is to be displayed in step S601 included in the process in step S812 (refer to FIG. 11).

Furthermore, in the process of FIG. 9, portions different from the process of FIG. 4 according to the first embodiment will be further described. The terminal migration controller 311 of the migration application 303 additionally describes extended information below in authentication extended region 735 of the registration parameter 731 received from the cooperative service.

{"sessionid": "ab12-127d-012b-2be5", "repeatnum": 2}

Here, "sessionid" included in the extended information indicates a unique ID in a unit of the sequence of FIG. 9. Furthermore, "repeatnum" indicates the total number of operative services registered in the service list which includes migration URLs.

In the second loop process 910 which is performed a number of times corresponding to the number of operative services per one migration process, the terminal migration controller 311 additionally describes the same value "sessionid" as specified extended information in all registration parameters received from the cooperative services in step S821. Here, as an example of the extended information additionally described, the extended information additionally described as described above in the assertion extended region 703 of the authentication parameter 701 is used. Alternatively, as with the first loop process 900, another extended information may be used.

Using the extended information, it is determined (as described below with reference to FIG. 10A) whether a screen 521 is to be displayed in the migration destination terminal 122 in step S822. Furthermore, the migration destination terminal 122 determines whether a screen 531 in step S611 included in the process in step S823 is to be displayed (as described below with reference to FIG. 10B).

Figure 10A:
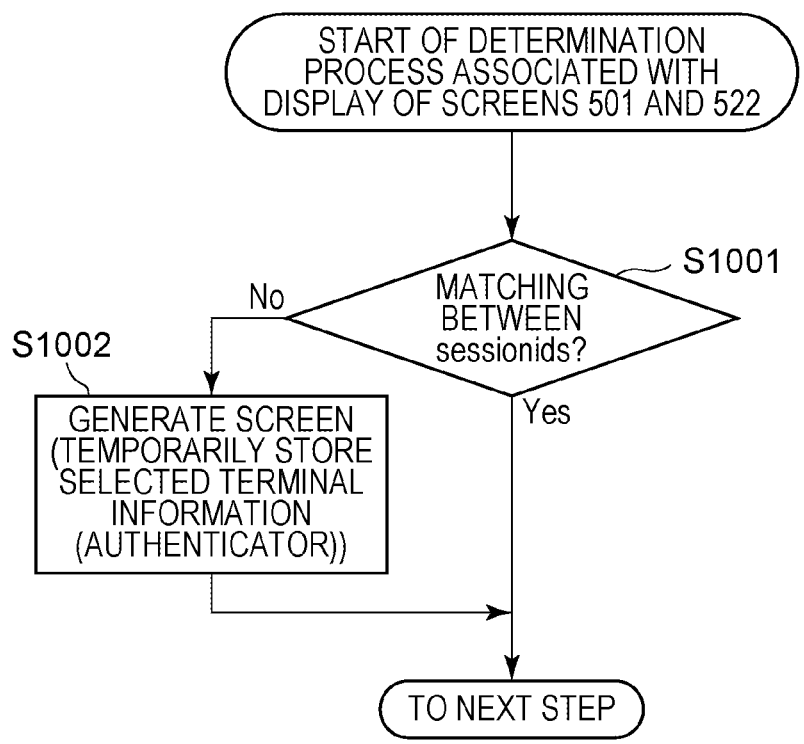
FIGS. 10A and 10B are flowcharts of display control processes performed by the migration destination terminal according to the second embodiment.

FIG. 10A is a flowchart illustrating an extension process performed by the migration destination terminal 122 for controlling display of a screen provided in step S810 and step S822 in FIG. 9.

First, the control in step S810 of FIG. 9 will be described. In step S810, as described with reference to FIG. 4, the authentication controller 322 receives the authentication parameter 701 from the terminal migration controller 311. The extended information has been additionally described in the assertion extended region 703 of the authentication parameter 701.

In step S1001, the authentication controller 322 determines whether sessionid of the extended information included in the assertion extended region 703 matches sessionid for the determination which has been stored in a memory. When the determination is negative, the process proceeds to step S1002. After the determination, the authentication controller 322 stores sessionid included as the extended information in the authentication parameter 701 newly received from the terminal migration controller 311 in this determination in the memory of the migration destination terminal 122 for the determination process to be performed next time in step S1001. Note that, when the process in step S810 is first performed in the first loop process 900 for each cooperative service, the determination is negative in step S1001.

In step S1002, the authentication controller 322 generates the screen 501 for selecting a migration source terminal. As described in step S810, the generated selection screen 501 is displayed in the touch panel 206 of the migration destination terminal 122. Thereafter, when a migration source terminal is selected through the selection screen 501, the authentication controller 322 displays the screen 511 which prompts performance of biometric authentication using the migration source terminal illustrated in FIG. 5B in the touch panel 206. Furthermore, the authentication controller 322 temporarily stores information on the migration source terminal (an authenticator) selected through the selection screen 501 in the memory.

Thereafter, in step S811, the authentication controller 322 transmits a request for authentication using authentication request data 711 illustrated in FIG. 7B to the biometric information authentication processor 332 of the migration source terminal 121 selected in step S810.

Here, when the determination is negative in step S1001, the authentication controller 322 does not generate the selection screen 501 of the migration source terminal 121. Specifically, the display of the screen 511 illustrated in FIG. 5B displayed after the process in step S1002 is maintained. Thereafter, in step S811, the authentication controller 322 transmits an authentication request using the authentication request data 711 illustrated in FIG. 7B to the biometric information authentication processor 332 of the migration source terminal 121 based on information on the migration source terminal (the authenticator) which has been temporarily stored in the memory.

Note that, also in step S822 of FIG. 9, the authentication controller 322 executes the process from step S1001 to step S1002 using the extended information additionally described in the authentication extended region 735 of the registration parameter 731. In step S822, the authentication controller 322 is activated in a state in which the registration parameters 731 are received from the cooperative services in the first loop process 900 and successively processes the registration parameters 731.

In step S1001, the registration controller 321 determines whether sessionid of the extended information included in the authentication extended region 735 matches sessionid for the determination which has been stored in the memory. When the determination is negative, the process proceeds to step S1002. After the determination, the registration controller 321 stores sessionid included as the extended information in the registration parameter 731 newly processed in this determination in the memory of the migration destination terminal 122 for the determination process to be performed next time in step S1001.

In step S1002, the registration controller 321 generates the screen 521 for selecting a migration destination. As described in step S822, the generated selection screen 521 is displayed in the touch panel 206 of the migration destination terminal 122. Thereafter, when a migration destination is selected through the selection screen 521, the registration controller 321 temporarily stores information on the terminal (an authenticator) selected as the migration destination in the memory. Subsequently, the registration controller 321 supplies registration request data 741 illustrated in FIG. 7E to the biometric information registration processor 331 of the authenticator 305 of the selected migration destination terminal 122.

Here, when the determination is negative in step S1001, the registration controller 321 does not generate the selection screen 521. Specifically, display of the selection screen 521 is skipped and the registration controller 321 supplies the registration request data 741 illustrated in FIG. 7E to the biometric information registration processor 331 of the authenticator 305 based on information on the migration destination which has been temporarily stored in the memory.

Figure 10B:
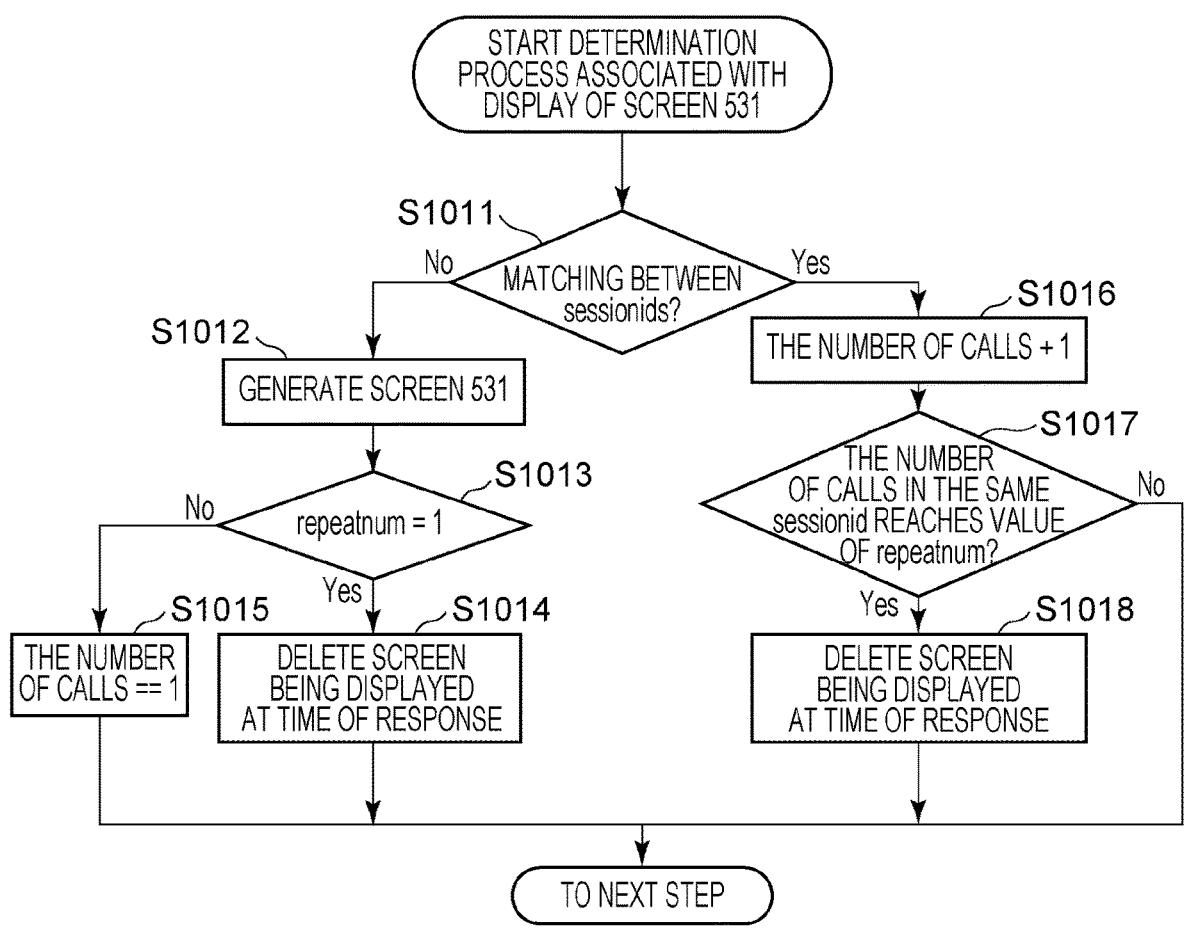

FIG. 10B is a flowchart illustrating a display control process associated with a request screen 531 to be executed by the migration destination terminal 122 in accordance with the process in step S611 and step S612 in the process in step S823 of FIG. 9. This process is started when the biometric information registration processor 331 receives the registration request data 741 as a registration request from the authentication client 304 to the authenticator 305.

In step S1011, the biometric information request unit 334 determines whether sessionid of the extended information additionally described in the registration request data 741 matches sessionid for the determination which has been stored in the memory. When the determination is negative, the process proceeds to step S1012, and otherwise, the process proceeds to step S1016.

In step S1012, the biometric information request unit 334 generates the request screen 531. As described in step S611, the generated screen 531 is displayed in the touch panel 206 of the migration destination terminal 122.

In step S1013, the biometric information request unit 334 determines whether a value of a parameter "repeatnum" included in the extended information additionally described in the registration request data 741 is 1. When the determination is affirmative, the process proceeds to step S1014.

In step S1014, the biometric information request unit 334 removes the request screen 531 being displayed in the touch panel 206 when receiving a feature value of biometric information input to the biometric information sensor 207 (S612). Specifically, the request screen 531 is removed from the touch panel 206 before credential information is transmitted as a response (S824) to the cooperative service after the biometric information is received.

When it is determined that the value of the parameter "repeatnum" is not 1, that is, the parameter "repeatnum" is an integer which is equal to or larger than 2, in step S1013, display of the request screen 531 in the touch panel 206 is maintained. In step S1015, the biometric information request unit 334 temporarily stores "1" as the number of calls in the memory.

In step S1016, the biometric information request unit 334 counts the number of times the registration request is performed by the registration request data 741 having the same sessionid by incrementing the number of calls by 1. In step S1017, the biometric information request unit 334 determines whether a value of the number of calls reaches the value of a parameter "repeatnum" included in the extended information additionally described in the registration request data 741. When the determination is affirmative, the process proceeds to step S1018.

In step S1018, the biometric information request unit 334 removes the request screen 531 being displayed in the touch panel 206 when receiving a feature value of the biometric information input to the biometric information sensor 207 (S612). Specifically, the request screen 531 is removed from the touch panel 206 before credential information is transmitted as a response (S824) to the cooperative service after the biometric information is received.

When it is determined that the number of calls has not reached the value of the parameter "repeatnum", that is, at least one cooperative service is to be processed in the second loop process (910), the display of the request screen 531 in the touch panel 206 is maintained.

Figure 11:
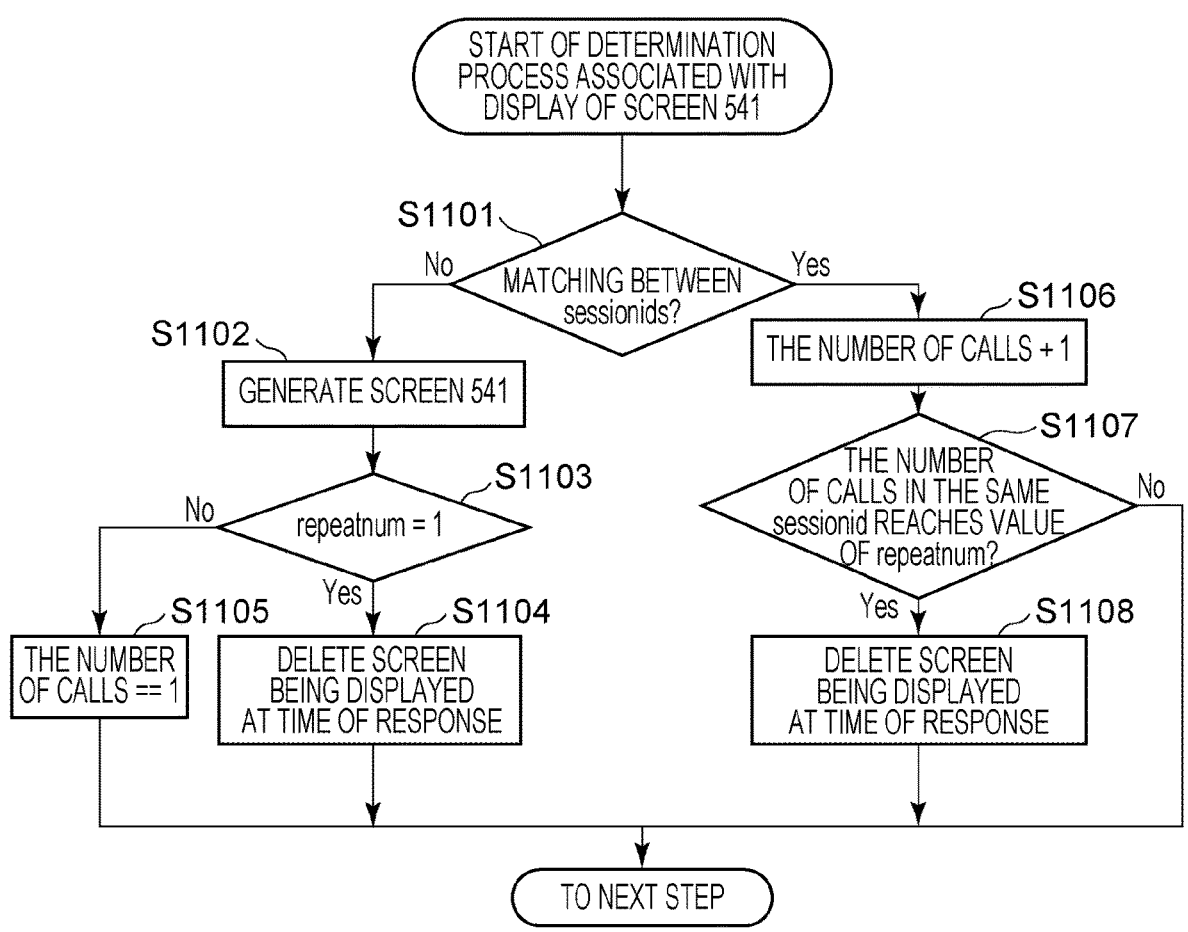
FIG. 11 is a flowchart of a display control process performed by the migration source terminal according to the second embodiment.

FIG. 11 is a flowchart illustrating a display control process associated with a request screen 541 to be executed by the migration source terminal 121 in accordance with the process in step S601 and step S602 in the process in step S812 of FIG. 9.

This process is started when the biometric information authentication processor 332 of the migration source terminal 121 receives the authentication request data 711 as an authentication request from the authentication client 304 of the migration destination terminal 122 to the authenticator 305 of the migration source terminal 121.

In step S1101, the biometric information authentication processor 332 of the migration source terminal 121 determines whether sessionid of the extended information additionally described in the authentication request data 711 matches sessionid for the determination which has been stored in the memory. When the determination is negative, the process proceeds to step S1102, and otherwise, the process proceeds to step S1106.

In step S1102, the biometric information authentication processor 332 of the migration source terminal 121 generates the request screen 541. As described in step S601, the generated screen 541 is displayed in the touch panel 206 of the migration source terminal 121.

In step S1103, the biometric information authentication processor 332 of the migration source terminal 121 determines whether a value of the parameter "repeatnum" included in the extended information additionally described in the authentication request data 711 is 1. When the determination is affirmative, the process proceeds to step S1104.

In step S1104, the biometric information authentication processor 332 removes the request screen 541 being displayed in the touch panel 206 of the migration source terminal 121 when receiving the feature value of the biometric information input to the biometric information sensor 207 of the migration source terminal 121 (S602). Specifically, the request screen 541 is removed from the touch panel 206 of the migration source terminal 121 before an assertion is returned to the migration destination terminal 122 (S813) after the biometric information is received.

When it is determined that the value of the parameter "repeatnum" is not 1, that is, the parameter "repeatnum" is an integer which is equal to or larger than 2, in step S1103, display of the request screen 541 in the touch panel 206 of the migration source terminal 121 is maintained. In step S1105, the biometric information authentication processor 332 of the migration source terminal 121 temporarily stores "1" as the number of calls in the memory.

In step S1106, the biometric information authentication processor 332 counts the number of times the authentication request is performed using the authentication request data 711 having the same sessionid by incrementing the number of calls by 1. In step S1107, the biometric information authentication processor 332 of the migration source terminal 121 determines whether a value of the number of calls has reached the value of the parameter "repeatnum" included in the extended information additionally described in the authentication request data 711. When the determination is affirmative, the process proceeds to step S1108.

In step S1108, the biometric information authentication processor 332 removes the request screen 541 being displayed in the touch panel 206 of the migration source terminal 121 when receiving the feature value of the biometric information input to the biometric information sensor 207 (S602). Specifically, the request screen 541 is removed from the touch panel 206 before an assertion is returned to the migration destination terminal 122 (S813) after the biometric information is received.

In step S1107, when it is determined that the number of calls has not reached the value of the parameter "repeatnum", that is, at least one cooperative service is to be processed in the first loop process (900), the display of the request screen 541 in the touch panel 206 of the migration source terminal 121 is maintained.

Other Embodiments

The present disclosure further includes an apparatus, a system, and a method and a system configured by combining the foregoing embodiments (the first and second embodiment and the first to third application example).

Other Embodiments

Embodiment (s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment (s) and/or that includes one or more circuits (e.g., application specific integrated circuit (ASIC)) for performing the functions of one or more of the above-described embodiment (s), and by a method performed by the computer of the system or apparatus by, for example, reading out and executing the computer executable instructions from the storage medium to perform the functions of one or more of the above-described embodiment (s) and/or controlling the one or more circuits to perform the functions of one or more of the above-described embodiment (s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)=), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A first information processing apparatus including a first authentication module and a first storage region having tamper resistance, the first information processing apparatus comprising:
   a memory storing instructions; and
   a processor executing the instructions causing the first information processing apparatus to:
   transmit verification data received from a service providing system to a second information processing apparatus;
   receive signature data from the second information processing apparatus,
   wherein the signature data is generated using the verification data and secret key information stored in the second information processing apparatus;
   transmit the signature data received from the second information processing apparatus to a service providing system, wherein the service providing system manages user information of a user of the second information processing apparatus and public key information for verification of the signature data; and
   execute a predetermined process,
   wherein the predetermined process includes:
   controlling for receiving input of biometric information of a user of the first information processing apparatus; and
   in response to a process of verification of the signature data is successfully performed based on the public key information managed in the service providing system, transmitting, to the service providing system, credential information which is generated by the first authentication module and is stored in association with the biometric information in the first storage region,
   wherein the credential information is managed in association with the user information by the service providing system.

2. The first information processing apparatus according to claim 1,
   wherein the credential information includes a first public key paired with a first secret key which is generated by the first authentication module, and
   wherein the first public key included in the credential information is transmitted after the first secret key and the biometric information have been stored in the first storage region.

3. The first information processing apparatus according to claim 1, wherein the biometric information indicates at least one of a fingerprint, a face, an iris, a vein, and a voiceprint of the user.

4. The first information processing apparatus according to claim 1, wherein the first authentication module is an internal authenticator for the first information processing apparatus.

5. A method for a first information processing apparatus including a first authentication module and a first storage region having tamper resistance, the method comprising:
- transmitting verification data received from a service providing system to a second information processing apparatus;
- receiving signature data from the second information processing apparatus,
- wherein the signature data is generated using the verification data and secret key information stored in the second information processing apparatus;
- transmitting the signature data received from the second information processing apparatus to a service providing system, wherein the service providing system manages user information of a user of the second information processing apparatus and public key information for verification of the signature data; and
- executing a predetermined process,
- wherein the predetermined process includes:
- controlling for receiving input of biometric information of a user of the first information processing apparatus; and
- in response to a process of verification of the signature data is successfully performed based on the public key information managed in the service providing system, transmitting, to the service providing system, credential information which is generated by the first authentication module and is stored in association with the biometric information in the first storage region,
- wherein the credential information is managed in association with the user information by the service providing system.

6. The method according to claim 5, wherein the credential information includes a first public key paired with a first secret key which is generated by the first authentication module,
- wherein the first public key included in the credential information is transmitted after the first secret key and the biometric information have been stored the first storage region.

7. The method according to claim 5, wherein the biometric information indicates at least one of a fingerprint, a face, an iris, a vein, and a voiceprint of the user.

8. The method according to claim 5, wherein the first authentication module is an internal authenticator for the first information processing apparatus.

9. A non-transitory computer readable storage medium on which is stored a computer program for making a computer execute a method for a first information processing apparatus including a first authentication module and a first storage region having tamper resistance, the method comprising:
- transmitting verification data received from a service providing system to a second information processing apparatus;
- receiving signature data from the second information processing apparatus,
- wherein the signature data is generated using the verification data and secret key information stored in the second information processing apparatus;
- transmitting the signature data received from the second information processing apparatus to a service providing system, wherein the service providing system manages user information of a user of the second information processing apparatus and public key information for verification of the signature data; and
- executing a predetermined process,
- wherein the predetermined process includes:
- controlling for receiving input of biometric information of a user of the first information processing apparatus; and
- in response to a process of verification of the signature data is successfully performed based on the public key information managed in the service providing system, transmitting, to the service providing system, credential information which is generated by the first authentication module and is stored in association with the biometric information in the first storage region,
- wherein the credential information is managed in association with the user information by the service providing system.

* * * * *